(12) United States Patent  
Bhalla

(10) Patent No.: US 8,175,636 B2  
(45) Date of Patent: May 8, 2012

(54) DESKTOP PHONE WITH INTERCHANGEABLE WIRELESS HANDSET

(75) Inventor: Sunil K. Bhalla, Fremont, CA (US)

(73) Assignee: Polycom Inc., Pleasanton, CA (US)

( * ) Notice: Subject to any disclaimer, the term of this patent is extended or adjusted under 35 U.S.C. 154(b) by 1265 days.

(21) Appl. No.: 11/537,530

(22) Filed: Sep. 29, 2006

(65) Prior Publication Data

US 2008/0081610 A1    Apr. 3, 2008

(51) Int. Cl.
*H04M 1/00* (2006.01)
*H04B 1/38* (2006.01)
(52) U.S. Cl. ............... 455/553.1; 455/557; 455/562; 455/565; 455/566
(58) Field of Classification Search .............. 455/557
See application file for complete search history.

(56) References Cited

U.S. PATENT DOCUMENTS 5,675,629 A * 10/1997 Raffel et al. ............. 455/552.1
5,913,163 A * 6/1999 Johansson ............... 455/426.1
6,987,988 B2 * 1/2006 Uchiyama ............... 455/557
7,330,737 B2 * 2/2008 Mahini .................... 455/557
7,634,296 B2 * 12/2009 Haeusel .................. 455/557
2005/0150959 A1 * 7/2005 Izzo et al. ............... 235/472.02

OTHER PUBLICATIONS

"Bluetooth," [Retrieved on Sep. 28, 2006)]; Retrieved from the Internet http://en.wikipedia.orgiwiki/Bluetooth.
"GN Netcom GN 9120 Quick Set-up Guide," [Retrieved on Sep. 29, 2006]; Retrieved from the Internet: http://www.gnnetcom.com.

* cited by examiner

*Primary Examiner* — Charles Appiah
*Assistant Examiner* — Natasha Cosme
(74) *Attorney, Agent, or Firm* — Wong, Cabello, Lutsch, Rutherford & Brucculeri LLP

(57) ABSTRACT

Systems, methods, and devices for providing an external wireless interface for use with a desktop telephone are disclosed. In accordance with various embodiments of the present disclosure, a telephone is provided which may include a universal connector operable to removably connect to any of a plurality of external radio transceivers. The external radio transceivers operate according a plurality of wireless communication protocols. In one embodiment, the universal connector may comprise a USB connector, and the external radio transceiver may be embodied as a USB dongle.

24 Claims, 6 Drawing Sheets

DESKTOP PHONE WITH INTERCHANGEABLE WIRELESS HANDSET

CROSS REFERENCE TO RELATED APPLICATIONS

This application is related to Ser. No. 11/076,360 filed on Mar. 9, 2005 entitled "Speaker Phone with a Cellular Phone Connection," which is co-pending and commonly owned. The contents of the referenced application are hereby incorporated herein.

BACKGROUND OF THE INVENTION

1. Field of the Invention

Without limiting the scope of the invention, the present invention relates generally to telephony and more particularly, to systems, methods, and devices for adding wireless functionality to a desktop telephone.

2. Description of the Related Art

Desktop telephones usually have wired handsets, which limits their range and usability. To help address this problem, some desktop telephones incorporate wireless or cordless handsets. While this can help user mobility, wireless handsets often have drawbacks with respect to compromised security, battery life, performance, bandwidth, cost, and capabilities.

To address these issues, there is a growing number of wireless technologies. However, most of these technologies, such as Bluetooth®, 802.11, DECT (Digital Enhanced Cordless Telecommunications), GSM (Global System for Mobile communication), and CDMA (Code-Division Multiple Access), etc., are incompatible with one another. Consequently, a user who buys a telephone with a wireless handset must make an irreversible selection of the wireless technology, and has no ability to change this without replacing the telephone.

This is an increasing problem because telephones are becoming more complex and expensive as IP telephony grows. For example, telephones are being equipped with more sophisticated displays, more capable built-in computers, video and high-quality audio capability, and more interfaces to other devices on the network and on the desktop. Hence, changing the wireless technology or changing its capabilities becomes a significant investment, requiring replacement of the entire telephone and often reconfiguration of the company network.

BRIEF SUMMARY OF THE INVENTION

Various embodiments of the present disclosure provide systems, methods, and devices for using a desktop telephone with an interchangeable wireless handset or headset or both. In accordance with various embodiments of the present disclosure, a telephone is provided which may include a CPU, an audio interface, a telecommunication channel interface to a landline telecommunication network, and universal connector. The universal connector is operable to removably connect to any of a plurality of interchangeable external radio transceivers. The external radio transceivers operate according a plurality of wireless communication protocols. In one embodiment, the universal connector may comprise a USB connector. The external radio transceiver may be embodied as a USB dongle.

In accordance with additional embodiments of the present disclosure, telecommunication systems are provided, which may include a landline telephone having a universal connector and an external, interchangeable wireless adapter having a radio transceiver and a mating universal connector. The mating universal connector is operable to removably connect to the universal connector of the telephone. The universal connector of the telephone is operable to removably connect to any of a plurality of external, interchangeable wireless adapters. The system may further include a wireless handset or a wireless headset or both.

In accordance with further embodiments of the present disclosure, methods of communicably coupling a landline telephone to any of a plurality of wireless communication devices are provided. The methods may include providing an external wireless adapter having a radio transceiver and a universal connector; removably connecting the universal connector of the external wireless adapter to a mating universal connector of the landline telephone; sending an outgoing audio signal from a microphone of the wireless communication device to the telephone via the radio transceiver; and receiving, by a wireless communication device, via the radio transceiver, an incoming audio signal received by the telephone from the landline. The wireless communication device may include a wireless handset or a wireless headset.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

Figure 1:
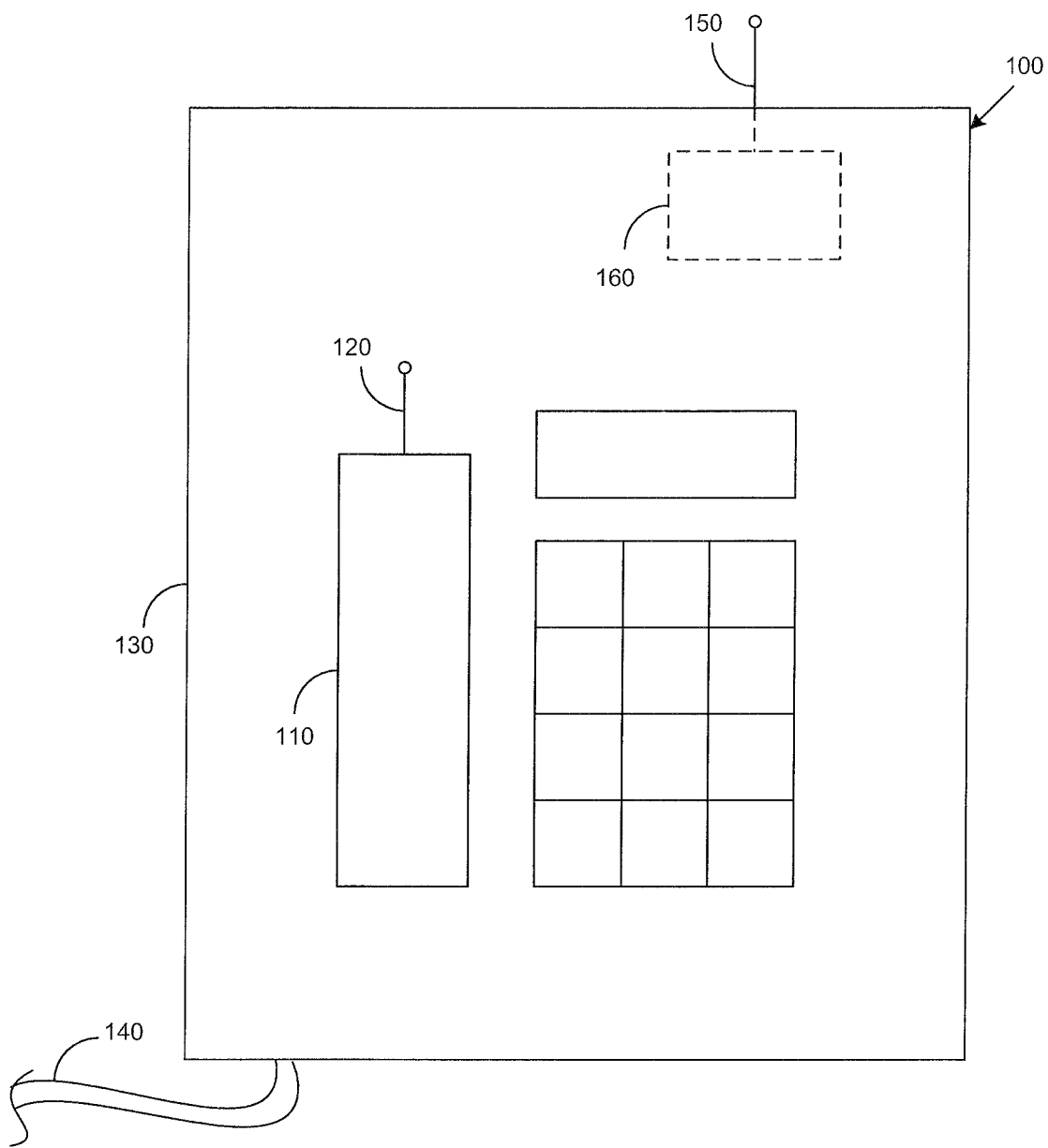
FIG. 1 depicts a top plan view of an exemplary desktop telephone in the prior art.

Reference is now made to FIG. 1 which depicts a top plan view of a prior-art desktop telephone 100. The telephone 100 comprises a wireless or cordless handset 110 having an antenna 120. The handset 110 communicates with a base unit 130 via radio waves. The base unit 130 is connected to a landline telephone network via a cable 140. The connection may be an analog POTS (Plain Old Telephone Service) line to the PSTN (Public Switched Telephone Network) or a digital service line such as an ISDN (Integrated Services Digital Network) line or an IP (Internet Protocol) connection.

Embedded within the telephone 100 is a radio transceiver 150 coupled to an antenna 160. As described above, built-in wireless interfaces on desktop telephones limit their flexibility. Some wireless protocols are country-specific, which requires the entire telephone to be built in multiple configurations. This makes manufacture and distribution more expensive and impractical. Some wireless protocols have limited range, some have poor or no security or encryption, some are too expensive, some have poor fidelity, some have limited additional data capabilities, and some are incompatible with established wireless systems or with established wireless mandates within a company. Since it is very difficult for a wireless vendor to manufacture versions that meet all needs, wireless handsets usually reflect a compromise which does not meet all customer needs. This makes them unusable in some countries and some companies, and of marginal utility in many more.

Figure 2:
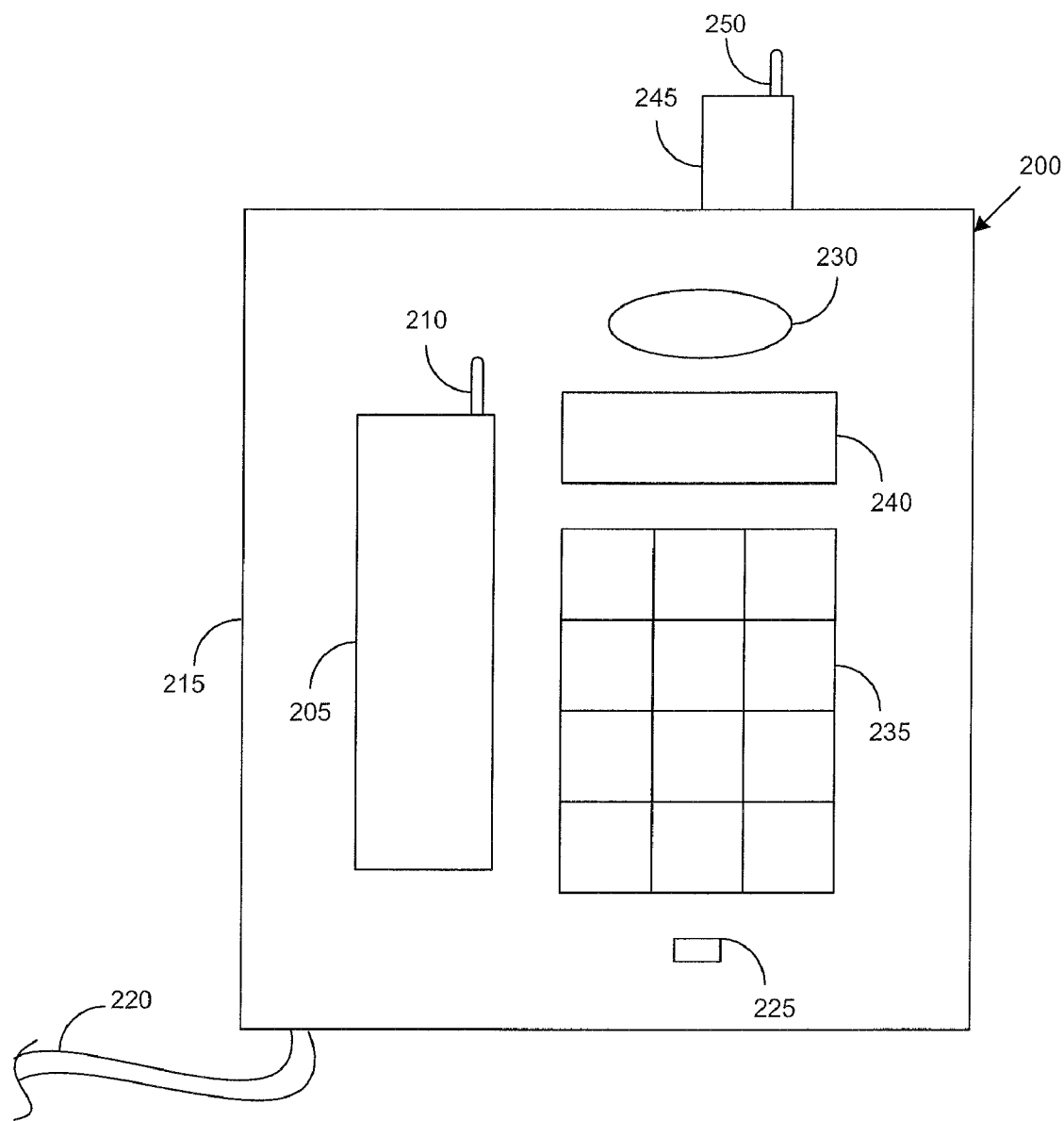
FIG. 2 depicts a top plan view of an exemplary desktop telephone in accordance with one embodiment of the present disclosure.

Reference is now made to FIG. 2 which depicts a top plan view of an exemplary desktop telephone 200 in accordance with various embodiments of the present disclosure. The telephone 200 may comprise a wireless or cordless handset 205 having an antenna 210. The telephone 200 may further comprise a base unit 215. The handset 205 can communicate with the base unit 215 via radio waves. The base unit 215 may be capable of RF (radio frequency) communication with additional compatible wireless or cordless handsets.

The base unit 215 may be connected to a telephone network via a cable 220. The connection may be an analog POTS line to the PSTN or a digital service line such as an ISDN line or an IP connection.

The handset 205 comprises a microphone and a speaker. In some embodiments, the handset 205 may further comprise a keypad or other input interface and a display screen. The base unit 215 may also comprise a hands-free microphone 225 and a hands-free speaker 230 such that the base unit 215 can operate as a speakerphone. Full-duplex capability may be provided. The base unit 215 may further comprise an input interface such as a keypad 235 which may include numeric keys as well as other buttons or other input means. The base unit 215 may further comprise a display screen 240. The display screen 240 may display text and images include caller ID information (e.g., the name and phone number of a calling party), an image or logo of the calling party, the current date, and time, the duration of the call, etc. In some embodiments, the display screen 240 may be a touch-screen device. In some embodiments, the display screen 240 may be used to display video during a video conference.

In accordance with various embodiments of the present invention, an external adapter device 245 may be removably coupled to the telephone 200. The external adapter device 245 houses a radio transceiver coupled to an antenna 250. In some embodiments, the external adapter device 245 may be embodied as a dongle, such as a USB (Universal Serial Bus) dongle, which plugs into a port of the telephone 200, such as a USB port. The external adapter device 245 is interchangeable and replaceable, unlike the prior-art embedded interfaces.

Figure 3:
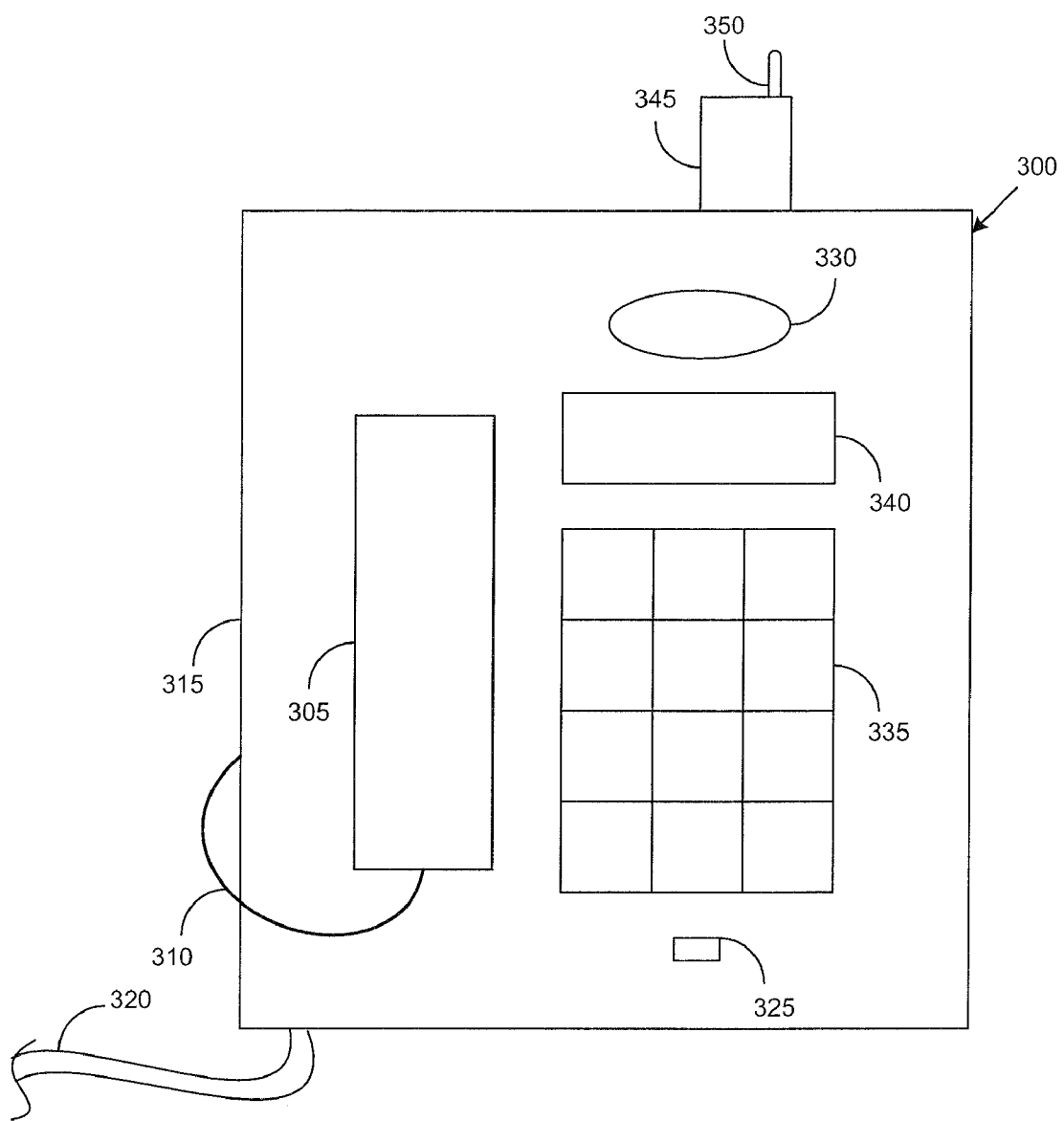
FIG. 3 depicts a top plan view of an exemplary telephone in accordance with another embodiment of the present disclosure.

In another embodiment, the telephone may include a wired handset. FIG. 3 depicts a top plan view of an exemplary desktop telephone 300 comprising a handset 305 which is coupled to a base unit 315 by a wire or cord 310. The telephone 300 can be later upgraded by adding a removable external adapter device 345 and a wireless handset. The external adapter device 345 houses a radio transceiver coupled to an antenna 350.

The base unit 315 may also comprise a hands-free microphone 325 and a hands-free speaker 330 such that the base unit can operate as a speakerphone. Full-duplex capability may be provided. The base unit 315 may further comprise an input interface such as a keypad 335 which may include numeric keys as well as other buttons or other input means. The base unit 315 may further comprise a display screen 340. The display screen 340 may display text and images include caller ID information (e.g., the name and phone number of a calling party), an image or logo of the calling party, the current date, and time, the duration of the call, etc. In some embodiments, the display screen 340 may be a touch-screen device. In some embodiments, the display screen 340 may be used to display video during a video conference. The base unit 315 may be connected to a telephone network via a cable 320.

Thus, in accordance with various embodiments of the present disclosure, the telephone's end of a wireless interface is moved from an embedded function to an external, replaceable interface. This allows for a new handset to be installed with an entirely different wireless protocol and/or capabilities by installing its matching wireless dongle at the same time. Handsets with substantially different capabilities, such as video, wideband audio, robust encryption, extended battery life, or full-duplex telephony, can be added to the basic phone easily. Multiple-mode handsets (such as 802.11 plus Bluetooth) can be added to an existing telephone by replacing the dongle at the same time. Significant changes to RF performance, including frequency, modulation, and power levels, can be implemented without having to replace the telephone. Avoiding the need to replace the telephone is a benefit to businesses, as there is no need for IT to get involved in configuration and network management.

Figure 4:
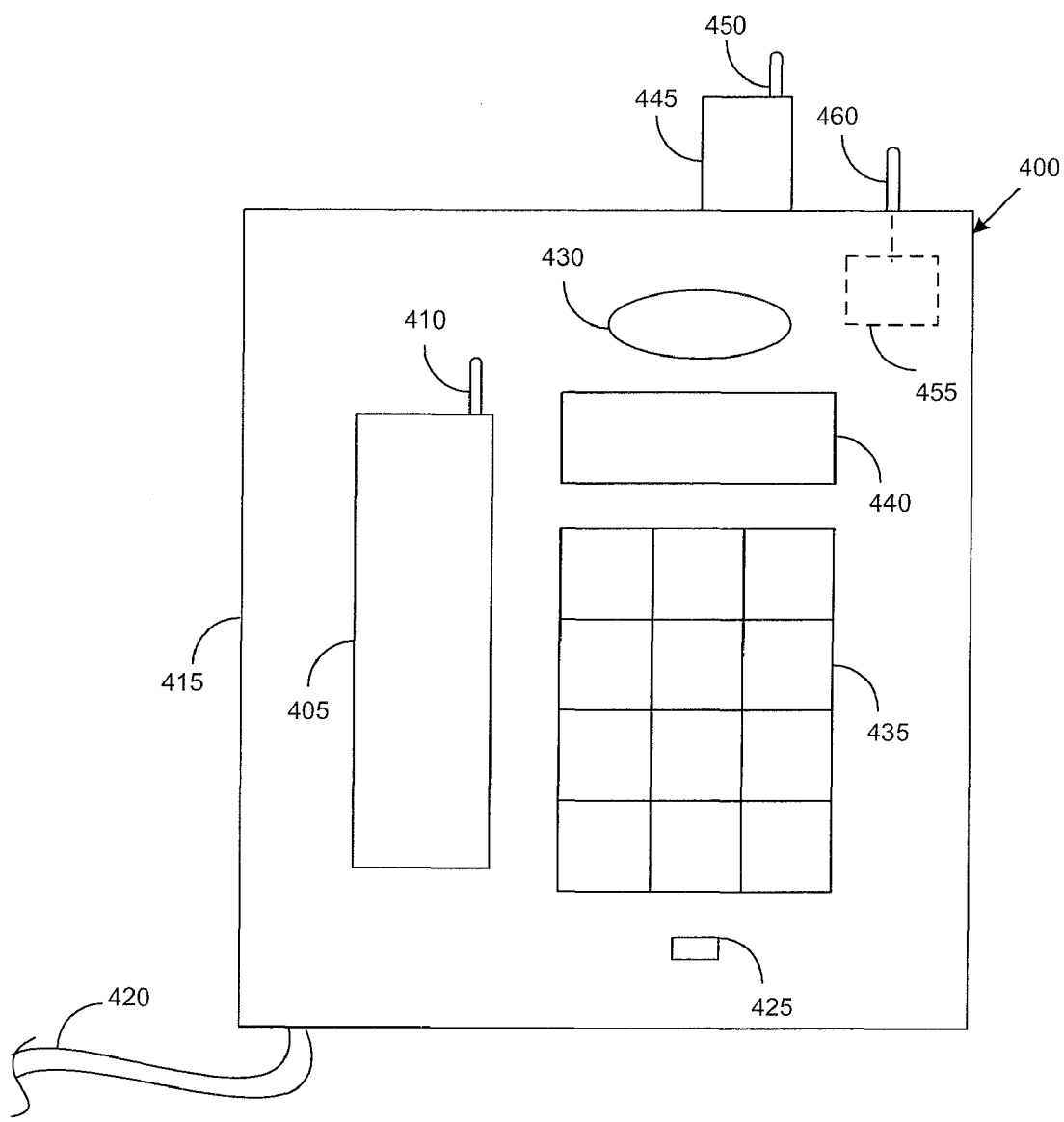
FIG. 4 depicts a top plan view of an exemplary telephone in accordance with yet another embodiment of the present disclosure.

In another embodiment, the telephone may have been manufactured with an embedded radio transceiver, but can still allow the addition or replacement of that internal capability by adding an external dongle plus new handset. FIG. 4 depicts a top plan view of a desktop telephone 400 which includes an embedded radio transceiver 455 and antenna 460. The desktop telephone 400 also includes a port, such as a USB port, for receiving an external adapter device 445. The external adapter device 445 houses a radio transceiver coupled to an antenna 450.

The desktop phone 400 comprises a base unit 415 and a wireless or cordless handset 405 having an antenna 410. The handset can communicate with the base unit 415 via radio waves. The base unit 415 may also comprise a hands-free microphone 425 and a hands-free speaker 430 such that the base unit 215 can operate as a speakerphone. Full-duplex capability may be provided. The base unit 415 may further comprise an input interface such as a keypad 435 which may include numeric keys as well as other buttons or other input means. The base unit 415 may further comprise a display screen 440. The display screen 440 may display text and images include caller ID information (e.g., the name and phone number of a calling party), an image or logo of the calling party, the current date, and time, the duration of the call, etc. In some embodiments, the display screen 440 may be a touch-screen device. In some embodiments, the display screen 440 may be used to display video during a video conference. The base unit 415 may be connected to a telephone network via a cable 420.

Figure 5:
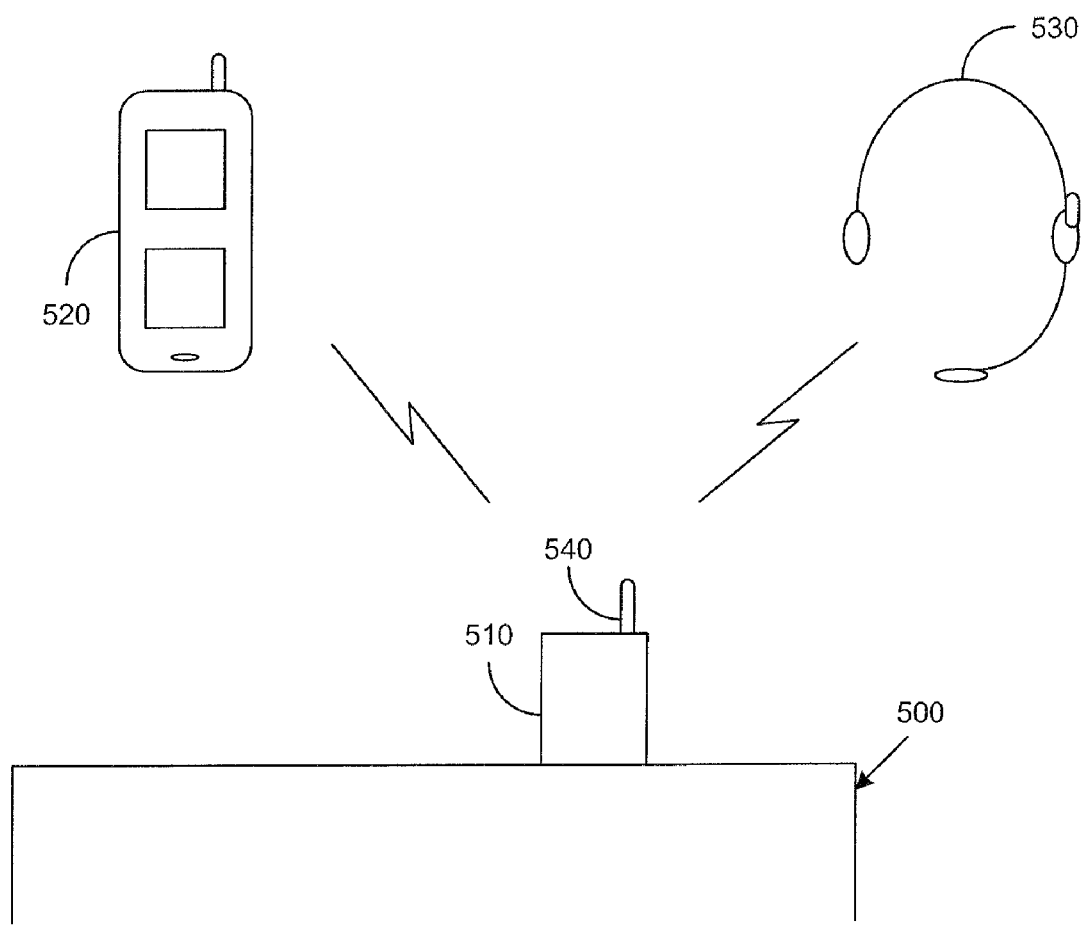
FIG. 5 depicts a top plan view of an exemplary communication system in accordance with another embodiment of the present disclosure.

By using a suitably designed adapter, a telephone can work with two or more different wireless systems or devices at the same time, such as a wireless headset from protocol X, plus a wireless handset from protocol Y. FIG. 5 depicts an exemplary block diagram of a system including a desktop telephone 500 with a replaceable external adapter device 510 capable of sending and receiving RF signals to a wireless handset 520 and a wireless headset 530. The desktop telephone 500 may be embodied as, for example, telephone 200, 300, or 400. The wireless handset 520 may comprise, for example, a cellular telephone. The wireless headset 530 may comprise, for example, headphones, earphones, or an earpiece. The external adapter device 510 may house a radio transceiver coupled to an antenna 540. In some embodiments, the external adapter device 510 may comprise a dongle, such as a USB dongle, which can be removably inserted into a port of the telephone 500, such as a USB port.

Figure 6:
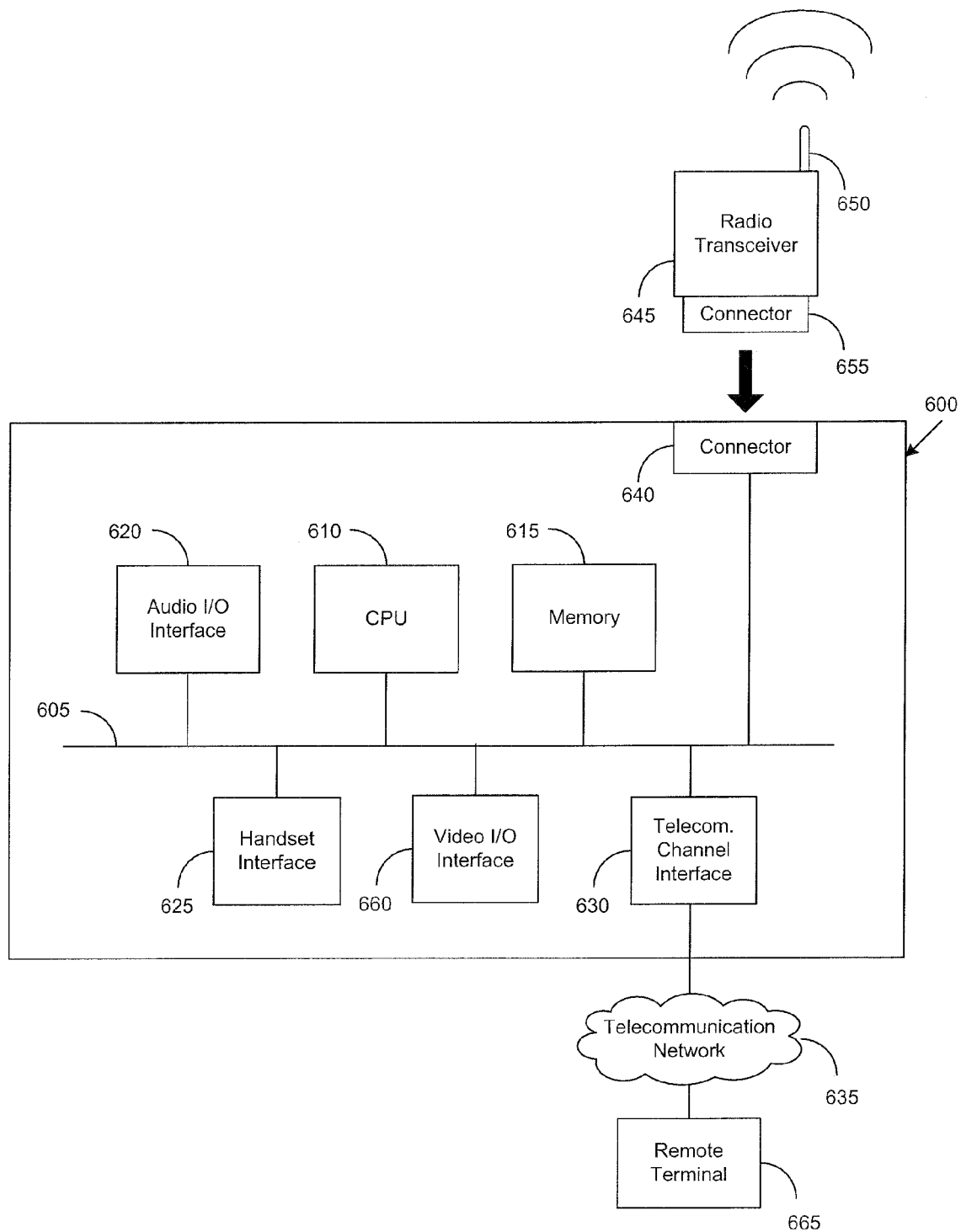
FIG. 6 depicts a block diagram of an exemplary communication system in accordance with various embodiments of the present disclosure.

Reference is now made to FIG. 6, which depicts a block diagram of an exemplary desktop telephone 600 for use with an external wireless adapter device 645 in accordance with various embodiments of the present disclosure. The telephone 600 comprises various components communicably coupled by at least one bus 605. The components may comprise a central processing unit (CPU) 610. The CPU 610 interprets and executes program instructions loaded from a memory 615. The memory 615, which may variously include volatile RAM (Random Access Memory), non-volatile ROM (Read-Only Memory), and/or storage devices such as magnetic disk drives or CD-ROMS, stores executable programs, data files, and other information.

The components may further comprise an audio input/output interface 620. The audio I/O interface 620 may exchange audio signals with one or more microphones and one or more speakers. The audio I/O interface 620 may process the audio signals, including performing analog-to-digital and digital-to-analog conversion and other signal processing tasks in connection with audio information received from one or more microphones or sent to one or more speakers.

In some embodiments, the components may optionally comprise a video input/output interface 660. The video I/O interface 620 may exchange video signals with one or more video displays and one or more cameras. The video I/O interface 620 may process the video signals, including performing analog-to-digital and digital-to-analog conversion and other signal processing tasks in connection with video information received from one or more cameras or sent to one or more displays.

The components may optionally comprise a handset interface 625. In an embodiment in which the desktop telephone includes a wireless or cordless handset, the handset interface 625 may comprise a cradle interface for coupling to the handset and electrically charging the handset. In an embodiment in which the desktop telephone includes a wired or corded handset, the handset interface 625 may comprise a socket for receiving a plug from the telephone handset wire or cord. In some embodiments, however, the telephone may comprise a base unit without a handset.

The components may further comprise a telecommunication channel interface 630 to a telecommunication network 635. In some embodiments, the telecommunication network 635 may include the PSTN. In some embodiments, the telecommunication channel interface 630 may comprise a socket for receiving a plug for an analog connection such as a POTS connection. In some embodiments, the telecommunication channel interface 630 may also comprise a socket for receiving a plug for a digital connection such as an ISDN connection or an IP connection. The telephone 600 can communicate with a remote terminal 665 via the telecommunication network 635.

In accordance with various embodiments of the present disclosure, the telephone 600 comprises a connector 640 for enabling a connection to an external adapter device 645 for housing a radio transceiver. The external adapter device may further comprise an antenna 650. The external adapter device 645 may comprise a mating connector 655 for removable connection to connector 640. In some embodiments, connector 640 may comprise a USB receptacle, and the external adapter device 645 may comprise a mating USB plug. The external adapter device 645 allows the telephone 600 to exchange signals with a wireless handset or wireless headset. The external adapter devices 645 is removable and interchangeable, allowing a variety of adapter devices may be interchangeably used. Accordingly, the telephone 600 can be adapted to communicate according to any of a variety of wireless protocols, whether currently known or later developed. Examples of currently known protocols and standards include without limitation, 802.11 (Wi-Fi®), 802.16 (WiMAX), Bluetooth®, DECT, DSRC (Dedicated Short Range Communications), GSM cellular, CDMA cellular, TDMA (Time Division Multiple Access) cellular, iDEN (Integrated Digital Enhanced Network), etc.

Thus, various embodiments of the present invention allow a wireless technology to be selected independently of the telephone. Various embodiments of the present invention also allow the wireless technology to be added later, or to be upgraded later. This is particularly useful in view of the trend to transition to IP telephony, resulting in rapidly changing needs and capabilities. Accordingly, it is less desirable to replace entire telephones in order to upgrade a handset. By offering a customer the ability to purchase a low-cost wired telephone and upgrade it with a wireless handset later, the customer can manage their telecommunication strategy more efficiently. Also, by providing a customer the ability to replace yesterday's wireless handset with a new wireless handset incorporating, for example, more robust encryption or better audio fidelity, without reprovisioning the telephone system, selection of a wireless handset to meet personal or business criteria can be made independently of network requirements.

The invention has been explained with reference to exemplary embodiments. While illustrative embodiments of the invention have been illustrated and described, it will be appreciated that various modifications can be made therein without departing from the spirit and scope of the invention. The foregoing description and drawings are, accordingly, to be regarded in an illustrative rather than a restrictive sense. To the extent that such modifications fall within the scope of the appended claims and their equivalents, they are intended to be covered by this patent.

What is claimed is:

1. A telephone for use with an external radio transceiver, comprising:
   a central processing unit (CPU);
   an audio interface coupled to the CPU;
   a telecommunication channel interface to a landline telecommunication network, wherein the telecommunication channel interface is coupled to the CPU;
   and a universal connector coupled to the CPU;
   wherein the universal connector is operable to removeably connect to any of a plurality of external interchangeable radio transceivers;
   wherein each of the plurality of external interchangeable radio transceivers operates according to at least one of a plurality of wireless communication protocols and operates to establish a wireless connection with a wireless handset.

2. The telephone of claim 1, wherein the plurality of wireless communication protocols comprises a cellular protocol.

3. The telephone of claim 1, wherein the universal connector comprises a universal serial bus (USB) port.

4. The telephone of claim 3, wherein at least one of the plurality of external interchangeable radio transceivers comprises a USB dongle.

5. The telephone of claim 1, further comprising:
   a hands-free microphone coupled to the CPU; and
   a hands-free speaker coupled to the CPU.

6. The telephone of claim 1, further comprising a telephone handset interface, wherein the telephone handset interface is operable to couple to a cordless handset.

7. The telephone of claim 1, further comprising a telephone handset interface, wherein the telephone handset interface is operable to couple to a corded handset.

8. The telephone of claim 1, wherein the telecommunication channel interface comprises a connection to an analog communication channel.

9. The telephone of claim 8, wherein the analog communication channel comprises a plain old telephone service (POTS) connection.

10. The telephone of claim 1, wherein the telecommunication channel interface comprises a connection to a digital communication channel.

11. The telephone of claim 10, wherein the digital communication channel comprises an integrated services digital network (ISDN) channel.

12. The telephone of claim 10, wherein the digital communication channel comprises an internet protocol (IP) channel.

13. The telephone of claim 1, further comprising:
a video interface coupled to the CPU.

14. A wireless communication system, comprising:
a telephone comprising:
    a central processing unit (CPU);
    a telecommunication channel interface to a landline telecommunication network, wherein the telecommunication channel interface is coupled to the CPU; and
    a universal connector coupled to the CPU; and
an external, interchangeable wireless adapter comprising:
    a radio transceiver within a housing;
    an antenna coupled to the radio transceiver; and
    a mating universal connector coupled to the housing;
wherein the mating universal connector is operable to removably connect to the universal connector of the telephone;
wherein the universal connector of the telephone is operable to removably connect to any of a plurality of external, interchangeable wireless adapters; and
wherein each of the plurality of external, interchangeable wireless adapters operates according to at least one of a plurality of wireless communication protocols and operates to establish a wireless connection with a wireless handset.

15. The system of claim 14, wherein the universal connector comprises a universal serial bus (USB) port.

16. The system of claim 15, wherein the mating universal connector comprises a USB plug.

17. The system of claim 14, wherein the plurality of wireless communication protocols comprises a cellular protocol.

18. The system of claim 14, further comprising:
a wireless handset operable to communicate with the radio transceiver via radio waves.

19. The system of claim 14, further comprising:
a wireless headset operable to communicate with the radio transceiver via radio waves.

20. A method of communicably coupling a landline telephone to any of a plurality of wireless communication devices, the method comprising:
providing an external interchangeable wireless adapter having a radio transceiver and a universal connector;
removably connecting the universal connector of the external interchangeable wireless adapter to a mating universal connector of the landline telephone;
sending an outgoing audio signal from a microphone of the wireless communication device to the landline telephone via the radio transceiver; and
receiving, by a wireless communication device, via the radio transceiver, an incoming audio signal received by the landline telephone from the landline.

21. The method of claim 20, wherein the universal connector comprises a USB plug.

22. The method of claim 21, wherein the mating universal connector comprises a USB port.

23. The method of claim 20, wherein the wireless communication device comprises a wireless handset.

24. The method of claim 20, wherein the wireless communication device comprises a wireless headset.

* * * * *